US012449603B2

(12) United States Patent
Shastri et al.

(10) Patent No.: US 12,449,603 B2
(45) Date of Patent: Oct. 21, 2025

(54) PASSIVELY-ALIGNED FIBER ARRAY TO WAVEGUIDE CONFIGURATION

(71) Applicant: Aayuna Inc., Allentown, PA (US)

(72) Inventors: Kalpendu Shastri, Orefield, PA (US); Anujit Shastri, Saratoga, CA (US); Soham Pathak, Allentown, PA (US); Bipin D. Dama, Bridgewater, NJ (US); Alan Leonhartsberger, Kempton, PA (US); Rutvij Dave, Allentown, PA (US); Rao Yelamarty, Allentown, PA (US)

(73) Assignee: AAYUNA, INC., Allentown, PA (US)

( * ) Notice: Subject to any disclaimer, the term of this patent is extended or adjusted under 35 U.S.C. 154(b) by 0 days.

(21) Appl. No.: 18/539,386

(22) Filed: Dec. 14, 2023

(65) Prior Publication Data
US 2024/0210627 A1 Jun. 27, 2024

Related U.S. Application Data

(63) Continuation-in-part of application No. 17/619,451, filed as application No. PCT/US2020/037602 on Jun. 12, 2020, now Pat. No. 11,886,013.
(Continued)

(51) Int. Cl.
G02B 6/30 (2006.01)
G02B 6/12 (2006.01)
(Continued)

(52) U.S. Cl.
CPC ............ G02B 6/30 (2013.01); G02B 6/3636 (2013.01); G02B 6/3692 (2013.01);
(Continued)

(58) Field of Classification Search
CPC ...... G02B 6/30; G02B 6/3636; G02B 6/3692; G02B 6/4228; G02B 6/136; G02B 2006/12097
See application file for complete search history.

(56) References Cited

U.S. PATENT DOCUMENTS 4,639,074 A 1/1987 Murphy
4,725,114 A 2/1988 Murphy
(Continued)

FOREIGN PATENT DOCUMENTS

EP 532470 5/1997
EP 0532470 B1 * 5/1997
(Continued)

OTHER PUBLICATIONS

Bergqvist et al., Machine Translation of EP-0532470-B1, May 21, 1997. (Year: 1997).*

Primary Examiner — Michelle R Connelly
(74) Attorney, Agent, or Firm — Millen, White, Zelano & Branigan P.C.; William F. Nixon

(57) ABSTRACT

Passive alignment and connection between a fiber array and a plurality of optical waveguides terminating along an edge of a photonic IC (PIC) is provided by a controlled mating between alignment V-grooves formed in a fiber array support substrate and extra-array alignment ridges formed beyond the extent of a waveguide array integrated within the PIC. The height and width of the alignment ridges are formed to engage with the alignment V-grooves upon mating of the fiber array substrate with the PIC, providing passive alignment while maintaining a physical gap spacing g between the components (ensuring the integrity of the passive alignment).

11 Claims, 18 Drawing Sheets

Related U.S. Application Data

(60) Provisional application No. 62/862,199, filed on Jun. 17, 2019.

(51) Int. Cl.
  *G02B 6/136* (2006.01)
  *G02B 6/36* (2006.01)
  *G02B 6/42* (2006.01)

(52) U.S. Cl.
  CPC .. *G02B 6/4228* (2013.01); *G02B 2006/12097* (2013.01); *G02B 6/136* (2013.01)

(56) References Cited

U.S. PATENT DOCUMENTS

| | | |
|---|---|---|
| 6,118,917 A | 9/2000 | Lee et al. |
| 6,157,759 A | 12/2000 | Seo et al. |
| 6,160,936 A | 12/2000 | You |
| 6,394,663 B2 | 5/2002 | Nakagawa |
| 6,957,004 B2 | 10/2005 | Richard et al. |
| 9,217,836 B2 | 12/2015 | Asghari et al. |
| 10,025,045 B2 | 7/2018 | Nuttall et al. |
| 10,048,455 B2 | 8/2018 | Pfnuer |
| 10,288,812 B1 | 5/2019 | Evans et al. |
| 10,656,339 B2 | 5/2020 | Patel |
| 2003/0206707 A1 | 11/2003 | Richard et al. |
| 2006/0110106 A1 | 5/2006 | Tsai et al. |
| 2006/0193560 A1 | 8/2006 | Yang et al. |
| 2017/0205592 A1* | 7/2017 | Pfnuer .................. G02B 6/423 |
| 2017/0351031 A1 | 12/2017 | Shastri et al. |
| 2019/0086618 A1 | 3/2019 | Shastri et al. |
| 2019/0250335 A1 | 8/2019 | Kulick et al. |
| 2020/0003955 A1 | 1/2020 | Kulick et al. |

FOREIGN PATENT DOCUMENTS

| | | |
|---|---|---|
| EP | 1168011 | 1/2002 |
| GB | 2195785 | 4/1988 |
| GB | 2219414 | 12/1989 |

* cited by examiner

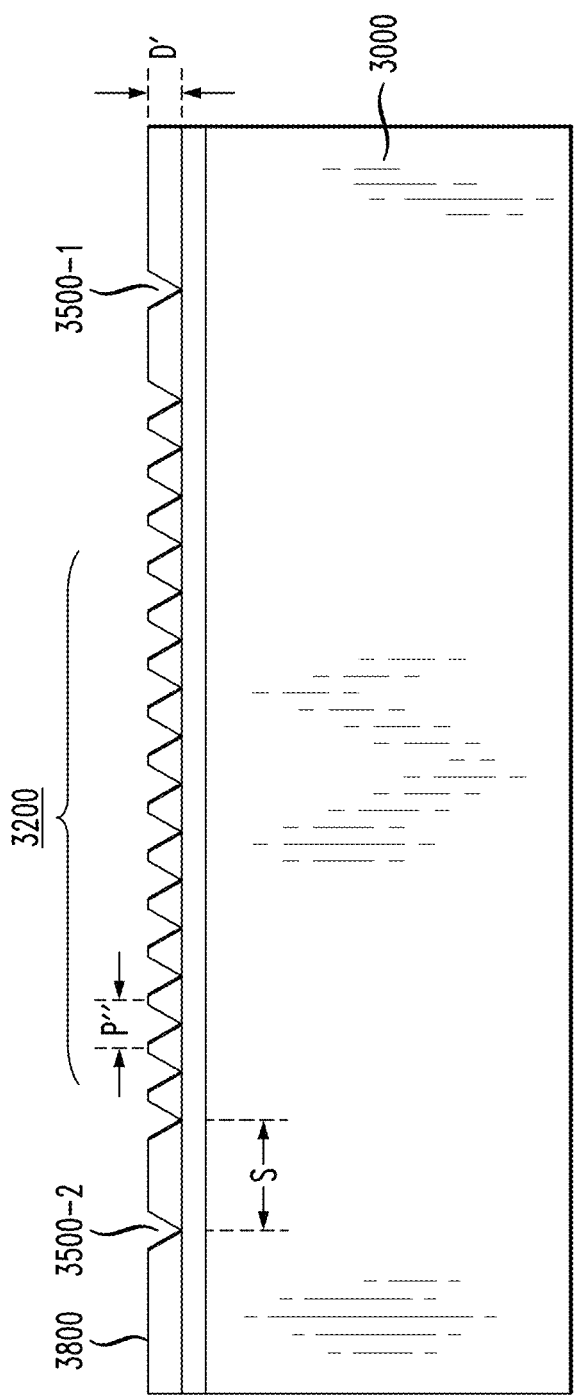

PASSIVELY-ALIGNED FIBER ARRAY TO WAVEGUIDE CONFIGURATION

CROSS-REFERENCE TO RELATED APPLICATIONS

This application is a continuation-in-part of U.S. application Ser. No. 17/619,451, which claims priority from U.S. Provisional Application No. 62/862,199, filed Jun. 17, 2019 and herein incorporated by reference.

TECHNICAL FIELD

The present invention relates to optical systems and, more particularly, to providing passively aligned interconnections between optical fiber arrays and waveguides formed within photonic integrated circuits.

BACKGROUND OF THE INVENTION

In the creation of optical-based communication systems, there is a continual need to connect optical fibers with photonic integrated circuits. The interconnection can be difficult and tedious, and may require the alignment of tens of individual fibers to a single photonic IC, with little or no room to maneuver multiple fibers in close proximity to the IC.

In most cases, the core region of each optical fiber needs to be aligned with an associated waveguide (or light emitting/receiving device) with a tolerance on the order of ±1-2 µm. While active alignment processes are available, they require a technician to measure the power coupled between a fiber and its associated signal path on the photonic IC, and define "alignment" when a maximum coupling is achieved. This active alignment process must then be repeated for each individual fiber. Dedicated equipment is required for the active alignment process that uses a sub-micron resolution multi-stage axis system with integrated cameras to control the positioning of the fiber core with respect to the waveguide so as to provide optical alignment between the components. Not only is the active alignment equipment expensive, but the active alignment process itself slows down the assembly process and limits throughput.

Some alternative solutions use V-grooves that are patterned and etched directly in a silicon-based photonic IC, with the patterning defined to passively align optical fibers positioned in the V-grooves with devices/waveguides of the photonic IC. While considered an improvement over active alignment in many situations, the need to include V-grooves on the photonic IC takes up valuable "real estate" that is better used for actual optical device formation. Moreover, problems remain in terms of controlling the axial alignment of the fibers along the longitudinal extent of the V-grooves, particularly over time where various types of bonding epoxy may slightly change shape and result in shifting the position of the fiber's core region with respect to the optical device/waveguide.

SUMMARY OF THE INVENTION

The needs remaining in the prior art are addressed by the present invention, which relates to an arrangement for providing passive alignment between a fiber array and a photonic IC without requiring the formation of fiber-supporting grooves in the photonic IC itself.

In accordance with the present invention, passive alignment and connection between a fiber array and a plurality of optical waveguides terminating along an edge of a photonic IC is provided by a controlled mating between V-grooves formed in a fiber support substrate and alignment ridges formed to surround waveguide terminations along an edge of a photonic IC. The V-grooves of the fiber support substrate are spaced to define the same pitch as the waveguides on the photonic IC, with the width of the alignment ridges formed to engage with the V-grooves upon mating of the fiber support substrate with the photonic IC.

The individual fibers are positioned within associated V-grooves such that their endfaces are positioned at an interior location along the V-grooves (i.e., retracted from the endface of the V-grooves). In this manner and in accordance with the configuration of the present invention, a defined proximal end portion of the V-grooves remains vacant. It is this proximal end portion that mates with the alignment ridges on the photonic IC to provide passive alignment between the fibers (as supported along the remaining portion of the V-grooves) and the waveguides that terminate within the alignment ridges.

It is an aspect of the present invention that the alignment ridge dimensions are controlled such that the mating surface (i.e., a "top" surface) of the fiber support substrate remains spaced apart from the mating surface of the photonic IC, ensuring that the passive optical alignment based on these parameters is not otherwise compromised by complete physical contact across the top major surfaces of the two components.

In certain embodiments of the present invention, additional alignment fiducials may be formed beyond the extent of the array end terminations, with the ability to form larger areas where bonding material may be positioned to strengthen the physical attachment between the components.

The configuration of the present invention is useful with any type of photonic integrated circuit, such as silicon PICs, polymer PICs, and the like. The specific material compositions of the waveguides, fibers, and their associated dimensions are all factors that are taken into consideration when determining the specific dimensions of the alignment ridges and fiber-supporting V-grooves.

An exemplary embodiment of the present invention takes the form of an interconnection arrangement providing passive alignment between an array of optical fibers and an array of optical waveguides integrated within an optical substrate, where the passive alignment is provided by a plurality of alignment ridges formed to engage with a plurality of V-grooves to passively align waveguides (within the ridges) to optical fibers (supported within the V-grooves). The plurality of alignment ridges is disposed to surround individual optical waveguides forming the array of optical waveguides, with the array of optical waveguides formed to exhibit a predetermined pitch between adjacent optical waveguides within the array. An optical fiber array support structure is configured to include a plurality of V-grooves for supporting the array of optical fibers and providing passive alignment with the plurality of alignment ridges. The plurality of V-grooves is formed to exhibit the same predetermined pitch as the waveguides, and includes a first portion for supporting the array of optical fibers and a second portion, defined as a proximal end portion, beyond an end termination of the array of optical fibers. The proximal end portion uses the V-grooves as alignment features that engage with the plurality of alignment ridges to provide passive alignment between the array of optical fibers and the array of optical waveguides.

Another embodiment of the inventive interconnection arrangement is configured to provide passive alignment between a (large) array of N optical fibers and an array of N optical waveguides. This embodiment comprises a photonic integrated circuit (PIC) and a fiber array substrate. The PIC includes the array of N optical waveguides (formed as an integrated element) and a plurality of M extra-array alignment ridges disposed beyond the extent of the array of N optical waveguides, where each extra-array alignment ridge exhibits a defined height h. The fiber array structure is formed to include an array of N fiber-supporting V-grooves and a plurality of M extra-array alignment V-grooves disposed to engage with the plurality of M extra-array alignment ridges in a one-to-one relationship and provide passive alignment between the array of N optical waveguides and the array of N optical fibers. Each extra-array alignment V-groove engages with its associated extra-array alignment ridge such that a pair of upper corners of each extra-array alignment ridge contacts inner sidewalls of the associated extra-array alignment V-groove at a location that creates alignment between a core region of an optical fiber supported within the associated V-groove and the optical waveguide integrated within the PIC so as to provide passive alignment between the array of optical fibers and the array of optical waveguides. The alignment ridge height h is selected to ensure that a gap spacing g remains between a top surface of the fiber array substrate and an engaging top surface of the PIC upon engagement of the plurality of M alignment V-grooves with the plurality of M alignment ridges.

Other and further embodiments of the present invention will become apparent during the course of the following discussion and by reference to the accompanying drawings.

BRIEF DESCRIPTION OF THE DRAWINGS

Referring now to the drawings, where like numerals represent like parts in several views:

FIG. 19 is a side view of the fiber array substrate of FIG. 18.

DETAILED DESCRIPTION

Figure 1:
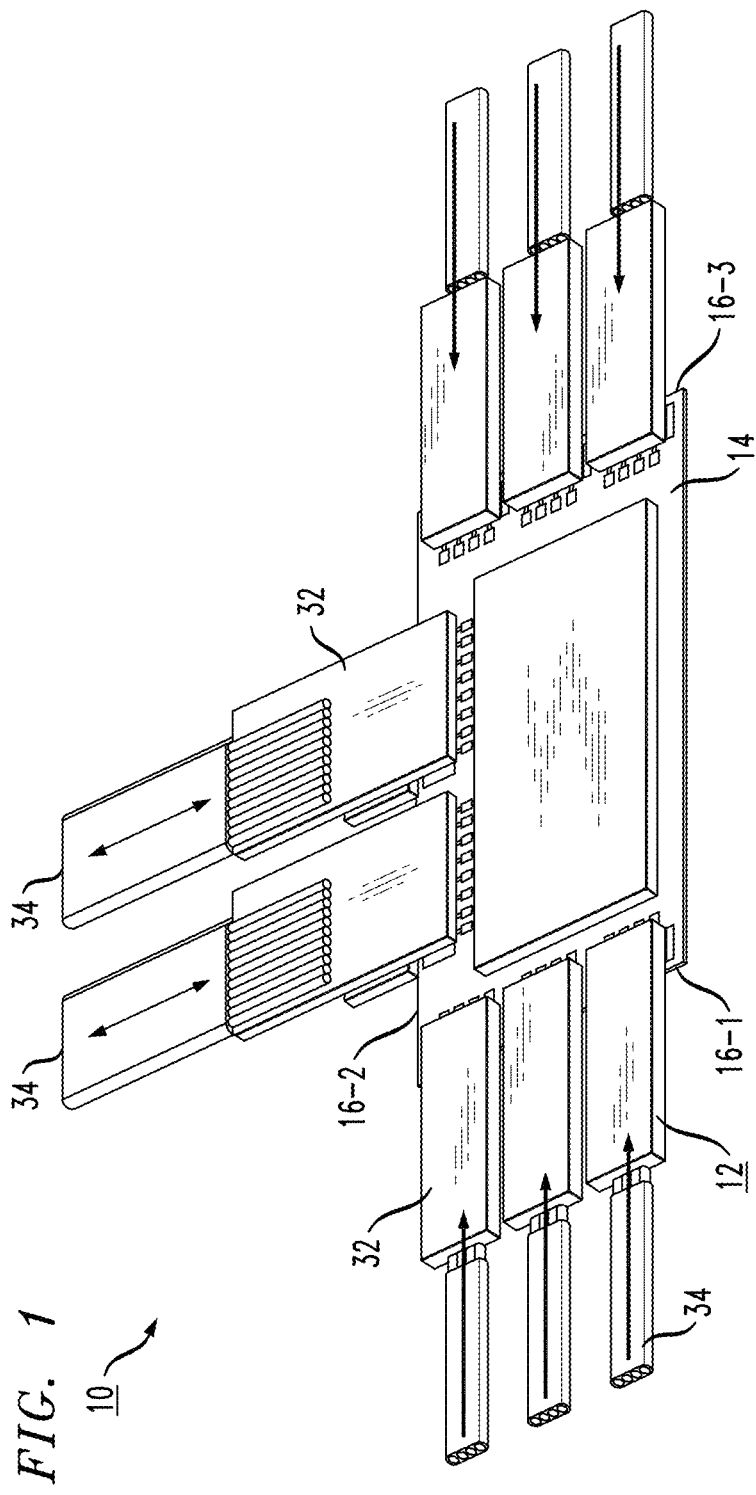
FIG. 1 depicts an exemplary interconnection arrangement between fiber arrays and a photonic integrated circuit (PIC) having waveguide arrays that terminate along one or more sidewalls of the PIC substrate.

FIG. 1 depicts an exemplary interconnection arrangement between various fiber arrays and a photonic integrated circuit including optical waveguides that are to be connected to these arrays. In the case of optical systems, connection between waveguides and fiber arrays is defined by providing optimum coupling of optical energy between a core region of an optical fiber and an optical waveguide, where both of these elements have a size on the order of less than 10 μm, and require an alignment tolerance on the order of ±1-2 μm. As mentioned above, active coupling between a fiber and a waveguide may be performed on an individual basis, but in many of today's photonic integrated circuit configurations such as that illustrated in FIG. 1, there are likely to be multiple arrays of fibers to be connected, with many arrays consisting of a group of twelve fibers.

The present invention proposes a passive alignment configuration that allows for a fiber array to be automatically aligned with its associated waveguide array upon attachment of the array's support structure to the PIC including the waveguide array. As will be described in detail below, an array of alignment ridges is formed to surround the waveguides using standard semiconductor fabrication pattern and etching processes, where the width of the alignment ridges are specifically designed to engage with the "vacant" proximal end portion of the fiber array V-groove structure such that passive fiber-to-waveguide alignment is achieved when the fiber array is mounted in "flip-chip" fashion over the ridges.

Turning now to FIG. 1, optical arrangement 10 is shown as having several optical fiber array support structures 12 that are to be coupled to optical waveguides (not shown) formed within a PIC 14, where the waveguides are formed to terminate along a defined sidewall 16 of PIC 14. In optical arrangement 10, three different sidewalls 16-1, 16-2, and 16-3 of PIC 14 are configured to support waveguides and alignment ridges. Obviously, this is only one example and various other arrangements may use all four sidewalls, only a single sidewall, etc. In the general illustration of FIG. 1, arrangement 10 is shown as providing interconnection between waveguide arrays of different dimensions and fiber arrays appropriately sized to support these waveguide arrays. Common examples are based upon the use of twelve-fiber array and four-fiber array configurations. The "upside-down" connection of fiber array support structures 12 around the periphery of PIC 14 is evident in this view.

Figure 2:
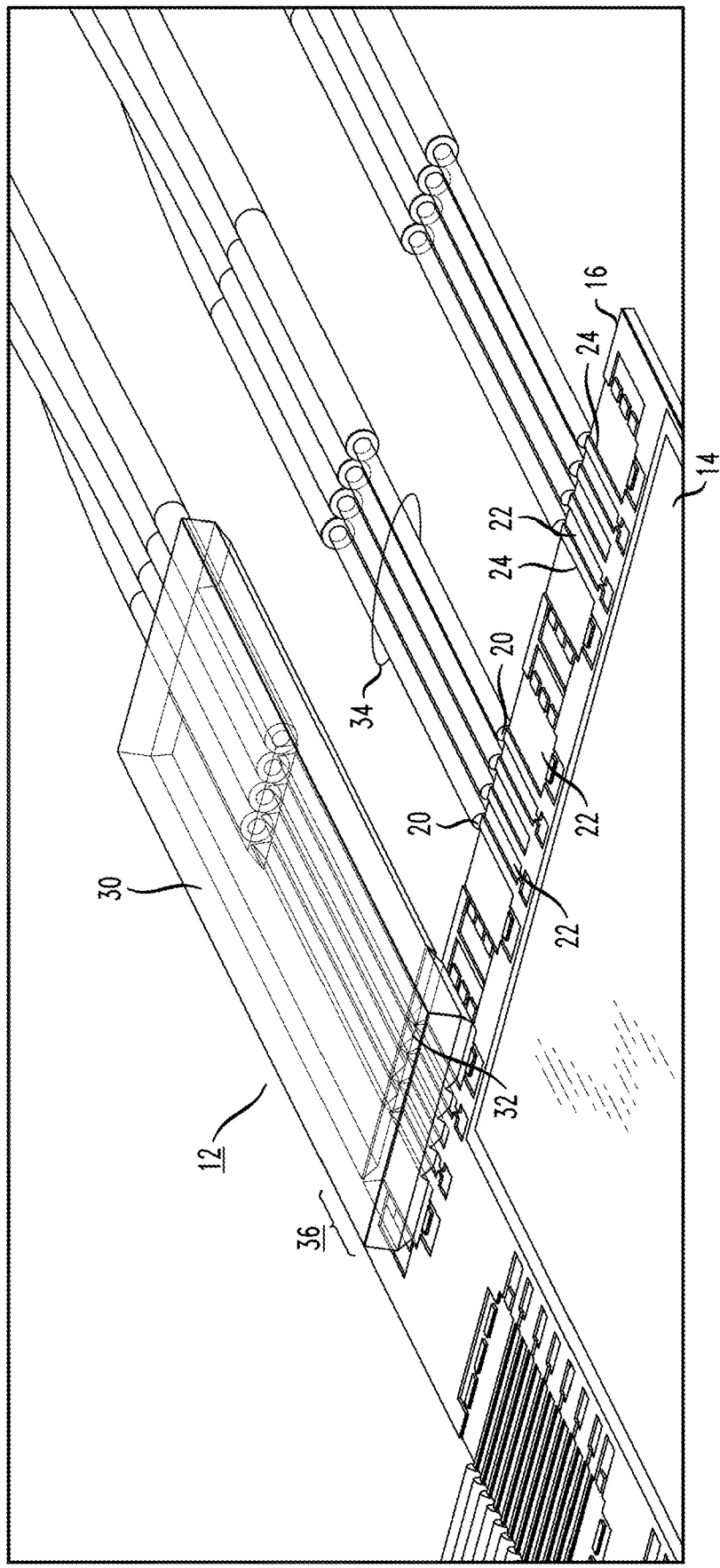
FIG. 2 is an enlargement of a portion of the illustration of FIG. 1, illustrating an exemplary fiber array support structure in engagement with a sidewall of the PIC substrate.

FIG. 2 is an enlargement of a portion of optical arrangement 10, where an exemplary fiber array support structure 12 is shown (in phantom) in engagement and alignment with a sidewall 16 of PIC 14. The details of the formation of the included V-grooves 32 and their engagement with alignment ridges 22 on PIC 14 will be discussed in detail below. Also shown in FIG. 2 is an array of fibers 34 with its support structure 12 being removed, illustrating the aligned position of the core region of each individual fiber 34$i$ with an individual optical waveguide 20; (not particularly illustrated) that is surrounded by an alignment ridge 22$i$. It is this set of alignment ridges 22 that engages with the "vacant" proximal end portion 36 of the fiber array support structure V-grooves 32 to provide passive alignment between fibers and waveguides within the acceptable ±1-2 µm tolerance.

Figure 3:
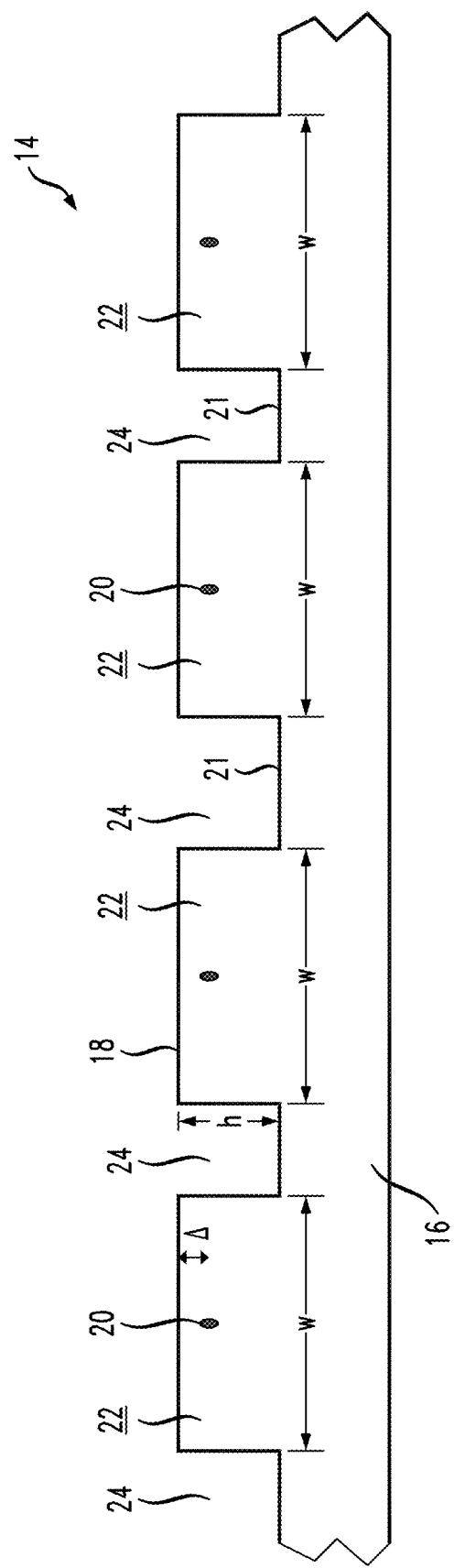
FIG. 3 is a simplified side view of an exemplary PIC configuration, illustrating an array of optical waveguides as terminating along a sidewall of the PIC substrate.
Figure 4:
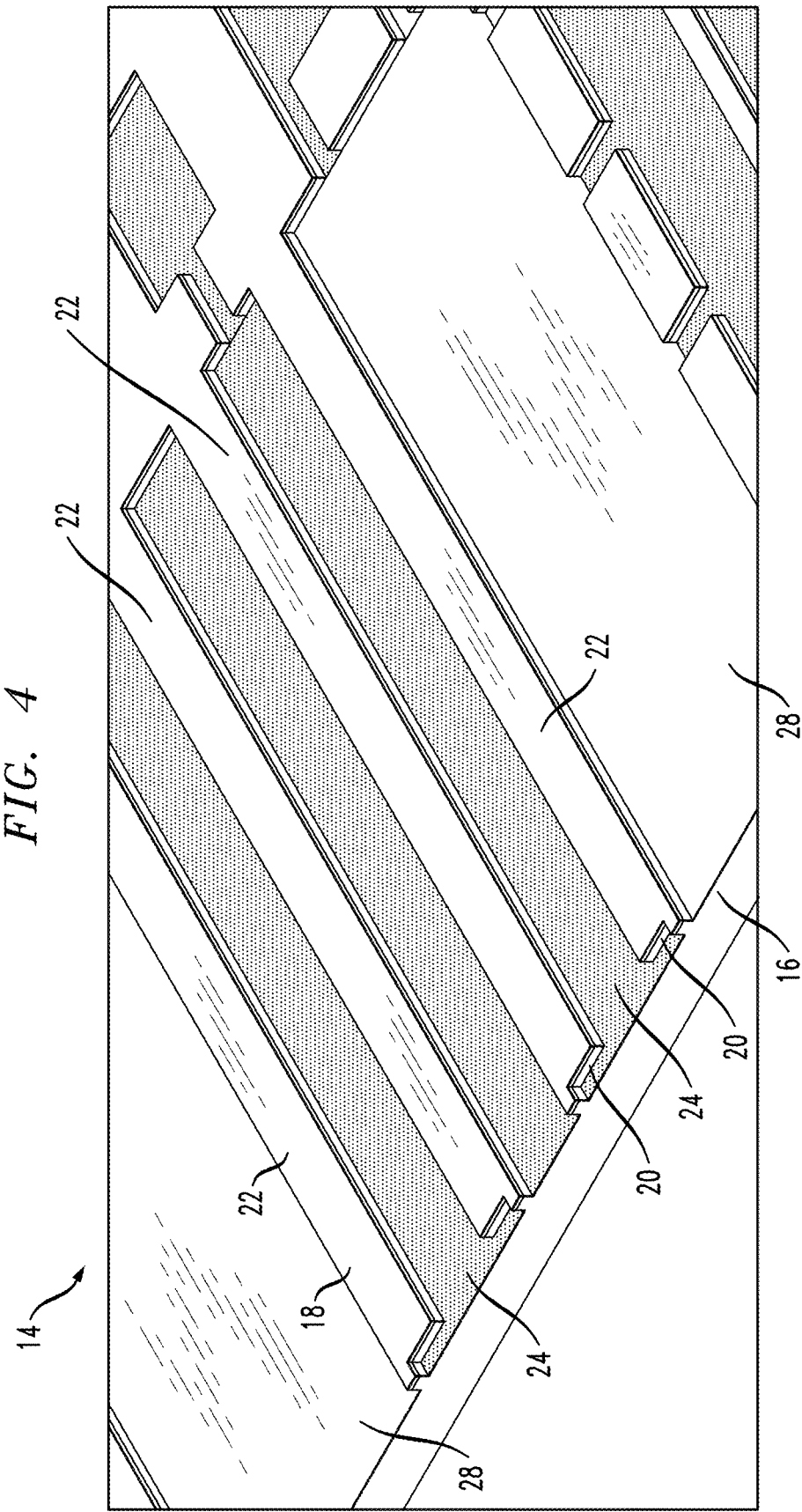
FIG. 4 is an isometric rendering of the side view of FIG. 3.

FIG. 3 is a simplified illustration of a side view of PIC 14, showing an array of optical waveguides 20 terminating along sidewall 16, with a plurality of alignment ridges 22 specifically formed to surround waveguides 20. FIG. 4 is an isometric rendering of a similar portion of PIC 14. In the particular configuration of FIGS. 3 and 4, an array of four waveguides 20 is shown as contained within an associated array of ridges 22.

In accordance with the teachings of the present invention, the alignment ridge structure is formed by using well-known integrated circuit fabrication techniques to remove portions of the PIC substrate material between adjacent waveguides 20. That is, a top surface 18 of PIC 14 is processed (patterned and etched) to form a series of trenches 24 that result in creating alignment ridges 22 of specified dimensions (in terms of at least width "w") as will be discussed below. The positioning of waveguide array 20 below top surface 18 is previously defined during the course of forming the waveguides in the first instance. In an exemplary waveguide fabrication process, waveguide array 20 may be disposed a distance A of about 5 µm below surface 18 (this is only one typical example of the spacing). As a result of the additional processing of the present invention to form alignment ridges, each waveguide 20 is now not only positioned at a predetermined depth "d" from top surface 18 of silicon PIC 14, but is also centered within the etch-defined width "w" of its associated alignment ridge 22.

An anisotropic process, such as reactive ion etching (RIE) or "deep" RIE (DRIE) may be used in alignment ridge fabrication process to create trenches 24 that define the locations of ridges 22. Importantly, the trench fabrication is controlled such that alignment ridges 22 exhibit a predetermined width w that is required to properly engage with V-grooves 32 in a manner that creates passive alignment between the array of optical fibers (more specifically, the core regions of the optical waveguides) and the array of optical waveguides. It is to be noted that while alignment ridges 22 are shown as having a constant width along their longitudinal extent L, it is also possible to fabricate and utilize alignment ridges that taper. In particular, some embodiments may utilize arrangement ridges that become narrower in the direction away from the end portion of PIC 14. Such an arrangement is contemplated to facilitate the initial placement of fiber support structure 12 (as discussed below), with the narrowing providing a further assurance of alignment between the components.

Figure 7:
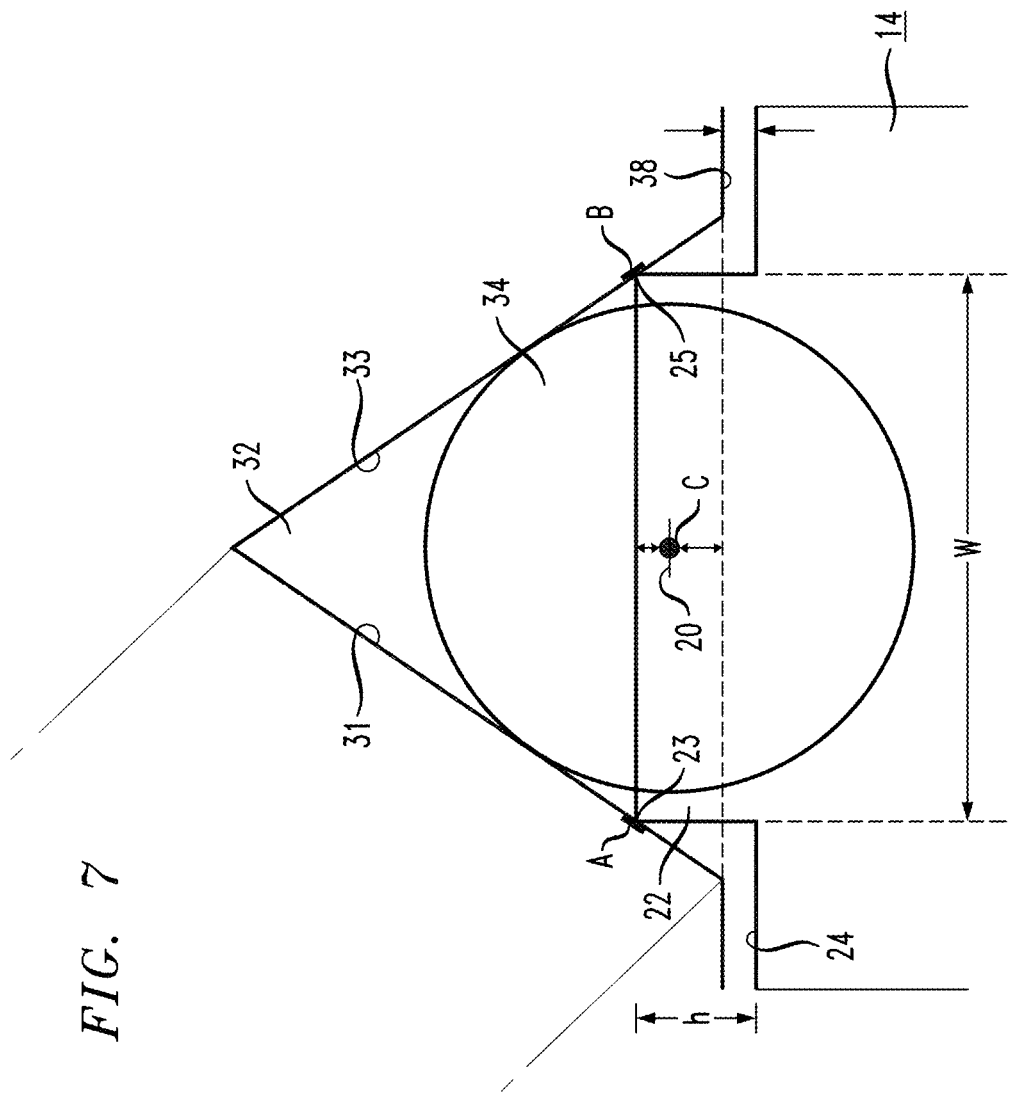
FIG. 7 is a diagram showing the relationship between the parameters of an individual V-groove and alignment ridge so that passive alignment between a core region of an optical fiber and an optical waveguide within the ridge is achieved.

In preferred embodiments of the present invention, the height "h" of alignment ridges 22 (measured from a floor surface 21 of trench 24 to top surface 18 of alignment ridge 22) is selected to ensure that a gap remains between floor surface 21 and the engaging "top" surface of substrate 30. This is best shown in FIG. 3, illustrating the height h of alignment ridge 22 as measured from floor surface 21 of etched trench 24 adjacent to an alignment ridge 22. FIG. 7, as will be discussed in detail below, illustrates in particular the influence of ridge height h, and how it is preferably selected to prevent contact between a top surface 38 of fiber support structure 12 and floor surface 21 of trenches 24, since this contact would result at times as not permitting V-grooves 32 to fully rest in place on alignment ridges 22. This aspect will become clearer below in association with the discussion of FIG. 7.

Figure 5:
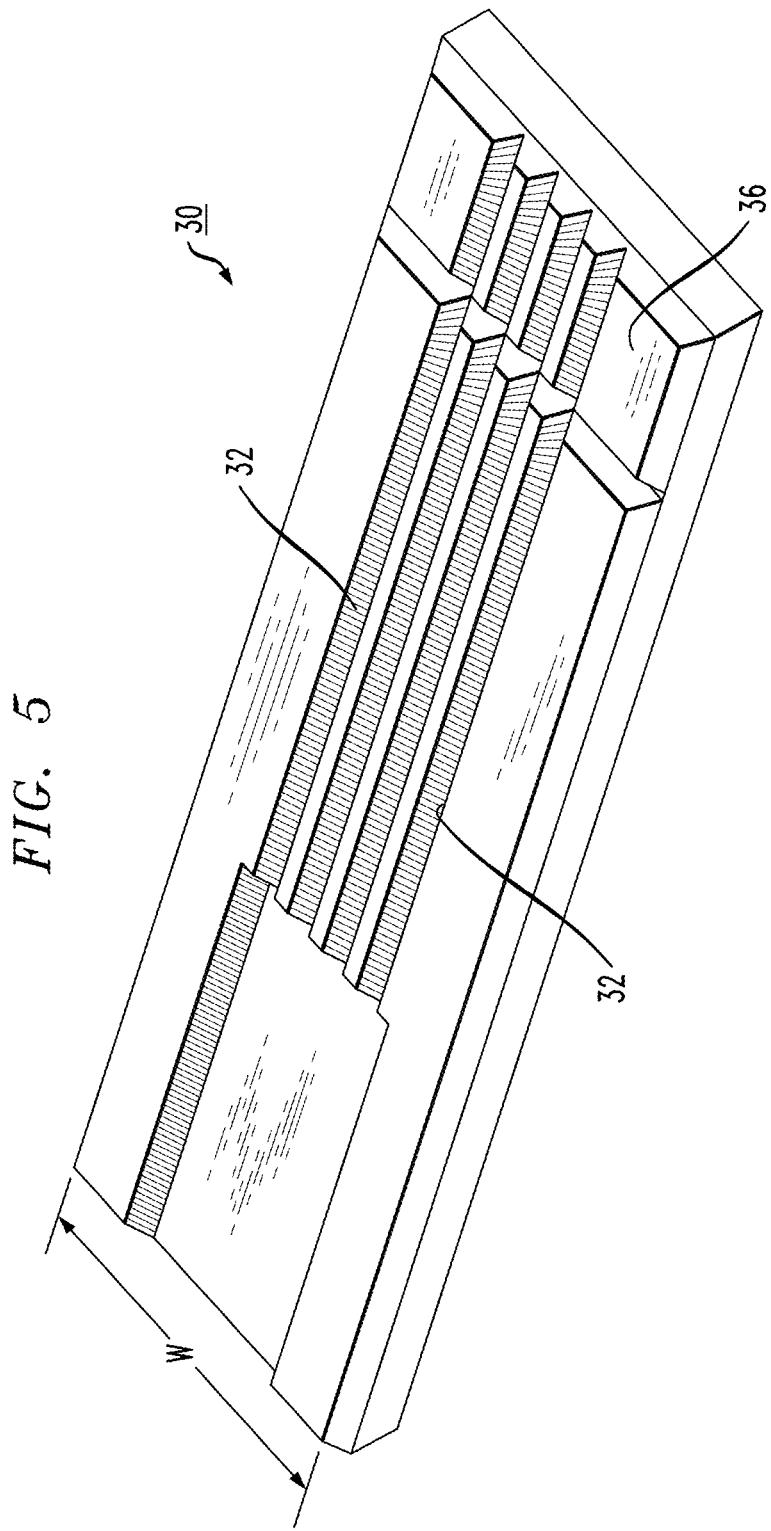
FIG. 5 is an isometric view of an exemplary fiber array support substrate formed in accordance with the principles of the present invention.
Figure 6:
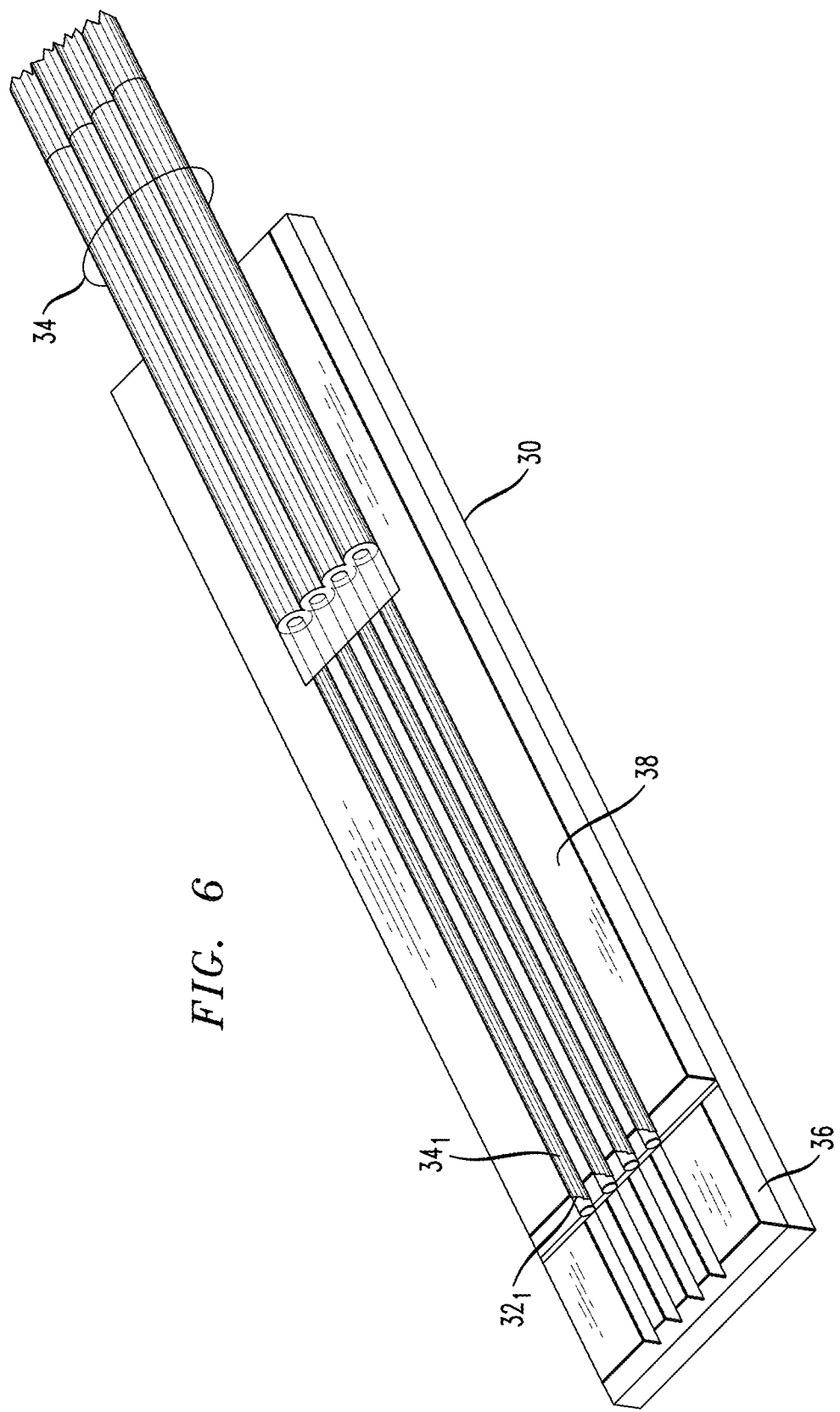
FIG. 6 is another illustration of the substrate of FIG. 5, in this case further illustrating the location of an optical fiber array to clearly show the proximal end portion of the support substrate that remains "empty" and is used as the alignment element for the fibers.

FIG. 5 is an isometric view of an exemplary fiber array substrate member 30, showing in particular a plurality of longitudinally-disposed V-grooves 32 that are formed in a predetermined spaced-apart configuration across the width W of substrate member 30 such that each individual V-groove supports a separate optical fiber. FIG. 6 illustrates a similar substrate 30, with an array of optical fibers 34 disposed within V-grooves 32. As discussed above in association with FIGS. 1 and 2, the complete fiber array substrate structure 12 (which includes other components not relevant to the subject matter of the present invention) is positioned "upside down" over a pre-designated area along an edge portion of PIC 14 that includes the array of waveguides 20 to be coupled to fiber array 34. The dimensions of V-grooves 32 formed within substrate 30 are designed to engage with alignment ridges 22 in the manner defined above when fiber array support structure 12 is placed in position over PIC 14, thereby providing passive alignment between fiber array 34 and waveguide array 20.

In accordance with the principles of the present invention, V-grooves 32 of fiber array support structure 12 are advantageously used for two purposes: (1) to support the associated fiber array 34; and (2) to function as alignment features for mating with alignment ridges 22 associated with waveguide array 20. In order to perform the latter function, the fiber array itself needs to be positioned at a somewhat "retracted" location along V-grooves 32 such that a proximal end portion 36 of substrate member 30 remains vacant and available for use as a passive alignment fixture. End portion 36 of substrate member 30 is shown in both FIGS. 5 and 6, where FIG. 6 in particular illustrates the retracted positioning of fiber array 34 along V-grooves 32 so that end portion 36 remains vacant. By virtue of using the same V-grooves for both of these functions (fiber support and alignment), in combination with the formation of alignment ridges around the individual optical waveguides, this exemplary configuration of the present invention is able to provide efficient and repeatable passive alignment between fiber arrays and waveguide arrays of any desired dimension.

FIG. 7 is a diagram showing the relationship between the parameters of an individual V-groove 32 and individual alignment ridge 22 that is utilized to provide passive alignment between the core region C of optical fiber 34 and optical waveguide 20 of silicon PIC 14. In particular, that alignment is achieved by selecting the width w of alignment ridge 22 such that top corner edges 23, 25 of ridge 22 contact inner sidewalls 31, 33 of V-groove 32 at locations A, B, which brings core region C of optical fiber 34 into alignment with waveguide 20 of PIC 14.

Thus, in accordance with the teachings of the present invention, by virtue of the ability to define the width w of alignment ridge 22 with sub-micron precision, and knowing the position A of waveguide 20 with respect to top surface 18 of alignment ridge 22, V-groove 32 may be formed to engage with side edges 23, 25 of ridge 22 at the precise location (here, points A, B) that provide alignment of the core region C of optical fiber 34 with waveguide 20. As a result of these pre-configured, corresponding dimensions of V-grooves 32 and the width w of alignment ridges 22, optical alignment between fiber core C and waveguide 20 is achieved "passively", meaning that when fiber array structure 12 is physically mated with silicon PIC 14, V-grooves 32 automatically engage with ridges 22, providing optical alignment with a sub-micron tolerance.

As discussed above, preferred embodiments of the present invention form ridges 22 not only to have the requisite width w to provide optical alignment, but also to have a height h that is at least tall enough to prevent top surface 38 of fiber substrate member 30 from coming into physical contact with floor surface 21 of trench 24 adjacent to alignment ridge 22. It is an aspect of the present invention that by preventing physical contact between fiber array support structure 12 and silicon PIC 14 in this manner, it is assured that alignment between an individual fiber core and its associated waveguide is based solely on the controllable parameters of the width w of alignment ridge 22 and the dimensions of V-groove 32.

Advantageously, conventional integrated circuit fabrication processes may be used to form ridges 22 by creating trenches 24 to have a depth that provides ridge height h with the preferred few-micron tolerance level. In some embodiments, a pair of outer trenches 28 may also formed, and used to bond the outer sides of fiber array support structure 12 to silicon PIC 14 (outer trenches shown explicitly in FIG. 4). Indeed, the etched structure as shown in FIGS. 2 and 4 also show various paths and locations for directing the flow of index-matching epoxy that is used to permanently bond fiber array support structure 12 to silicon PIC 14.

In one exemplary embodiment where silicon PIC 14 has a thickness of 100 µm, the height h of an alignment ridge 22 may be on the order of about 25 µm (±5 µm). This value is considered to be exemplary only. The spacing between adjacent ridges 22 is designed as a function of the pitch P (illustrated in FIG. 14) between adjacent waveguides 20. Accordingly, the array of V-grooves 32 is necessarily spaced so that supported fibers 34 exhibit the same pitch as waveguides 20. Depending on the specific type of fibers supported in the array (e.g., single mode fiber, PM fiber, reduced-cladding fiber, etc.), the pitch P may be different. Thus, the pattern used to define the etching step is adjusted, as necessary, when the pitch P is modified.

PIC 14 is preferably patterned and etched using known techniques to simultaneously form all of the desired trench patterns at each specific location around its periphery. Indeed, the process of forming passive alignment ridges 22 may be part of a wafer-scale process where a large number of PICs are fabricated at the same time. One preferable technique for forming ridges 22 is a deep reactive ion etch (DRIE) technique, which is able to quickly remove appreciable depths of material. However, other techniques are possible. Indeed, any process capable of forming the trenches with the necessary accuracy (e.g., ±1-2 µm tolerance on the width w of alignment ridge 22) may be used in accordance with the present invention.

Figure 8:
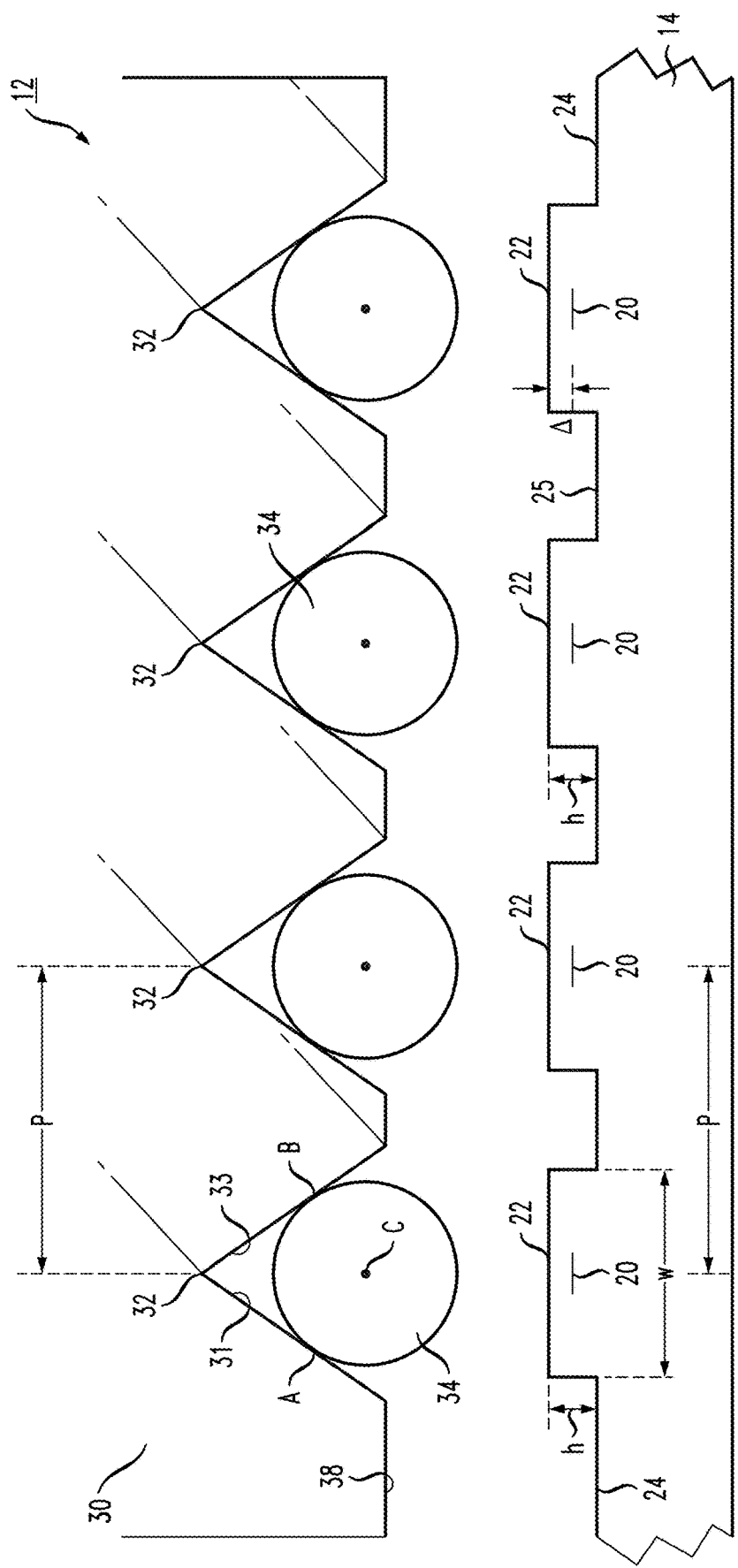
FIG. 8 is a diagram showing a side view of an exemplary fiber array support substrate as positioned over the area of the PIC substrate that includes the alignment ridges.

FIG. 8 is a diagram showing a side view of fiber array support structure 12 in position over (but not yet engaged with) silicon PIC 14. Clearly shown in this view is substrate member 30, including the location of a set of four V-grooves 32 in position over the locations of an associated array of four waveguides 20 as formed within a set of four alignment ridges 22. An array of four optical fibers 34 is shown as positioned within V-grooves 32, where it is to be recalled that fibers 34 are disposed in a somewhat retracted position along V-grooves 32 so that a sufficient end portion 36 of substrate 30 is available to form the cantilevered configuration that provides the actual engagement of the proximal end portions of V-grooves 32 with alignment ridges 22.

Figure 9:
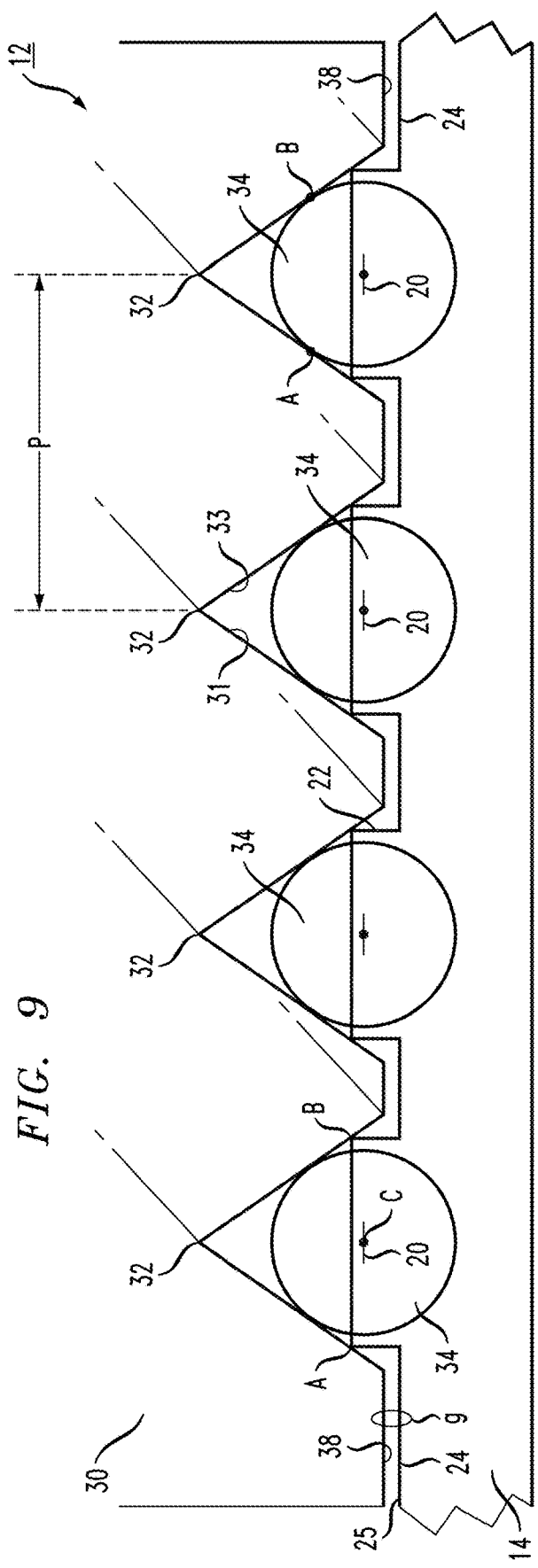
FIG. 9 illustrates the same components as shown in FIG. 8, but in this case subsequent to the mating of the fiber array support substrate with the PIC substrate, providing the desired passive alignment.

FIG. 9 shows the final, aligned form of the assembly, with the "empty" end regions of V-grooves 32 engaged with alignment ridges 22. In accordance with the teachings of the present invention, this combination provides passive alignment between the core regions C of optical fibers 34 and waveguides 20 within alignment ridges 22. In particular, alignment is achieved in accordance with the present invention, by forming ridges 22 to exhibit a width w that will allow for a core region of fiber 34 as supported within V-groove 32 to align with waveguide 20. The pitch P between the core regions of adjacent fibers 34 is shown in FIGS. 8 and 9, where as mentioned above this pitch P is associated with the spacing between adjacent ridges 22 required to accurately and precisely mate with V-grooves 32 and provide passive alignment. Also clearly shown in FIG. 9 is the remaining spacing gap g between the top surface 38 of fiber substrate 30 and trench 24 in silicon PIC 14. As described above, preventing physical contact between the top surface of the fiber array and the silicon PIC ensures that the passive alignment is accurate and not affected by other surfaces coming into contact with one another.

Figure 10:
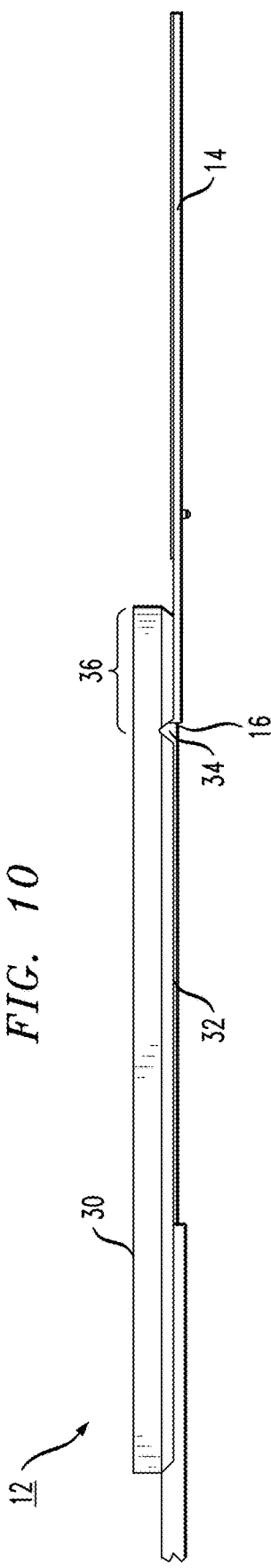
FIG. 10 is a rendering of a side view of the assembly of FIG. 9, showing the position of the endface of the fiber array along a sidewall of the PIC substrate.

FIG. 10 is a rendering of a side view of the assembly, showing the position of the endface of fiber array 34 along sidewall 16 of silicon PIC 14. The proximal end portion 36 of fiber substrate 30 that is used to provide passive alignment is clearly shown as engaged with a peripheral region of PIC 14 that supports waveguides 20 within alignment ridges 22. In some cases, an index-matching epoxy can be used to form a physical bond between the aligned optical fiber 34 and waveguide 22.

As mentioned above, the continual evolution of larger data capacity communication systems will necessitate upgrades in optical interconnect arrangements to support larger numbers of parallel communication paths. For example, it is becoming common to utilize a set of thirty-two parallel communication channels which may comprise an array of thirty-two individual optical waveguides coupled to an array of thirty-two individual fibers. When providing a passive alignment configuration to handle this larger-sized arrangement, the utilization of individual alignment ridges surrounding each individual waveguide may be problematic, particularly in applications where it is desired to achieve as compact a physical layout as possible.

The following embodiment of the present invention addresses the concerns associated with passive alignment of relatively large arrays of waveguides and optical fibers, in particular by eliminating the intra-array alignment ridges, utilizing instead a passive alignment structure disposed beyond the extent of both the optical waveguide array and the optical fiber array. FIGS. 11-18, as discussed below, illustrate details of two configurations of this alternative embodiment.

Figure 11:
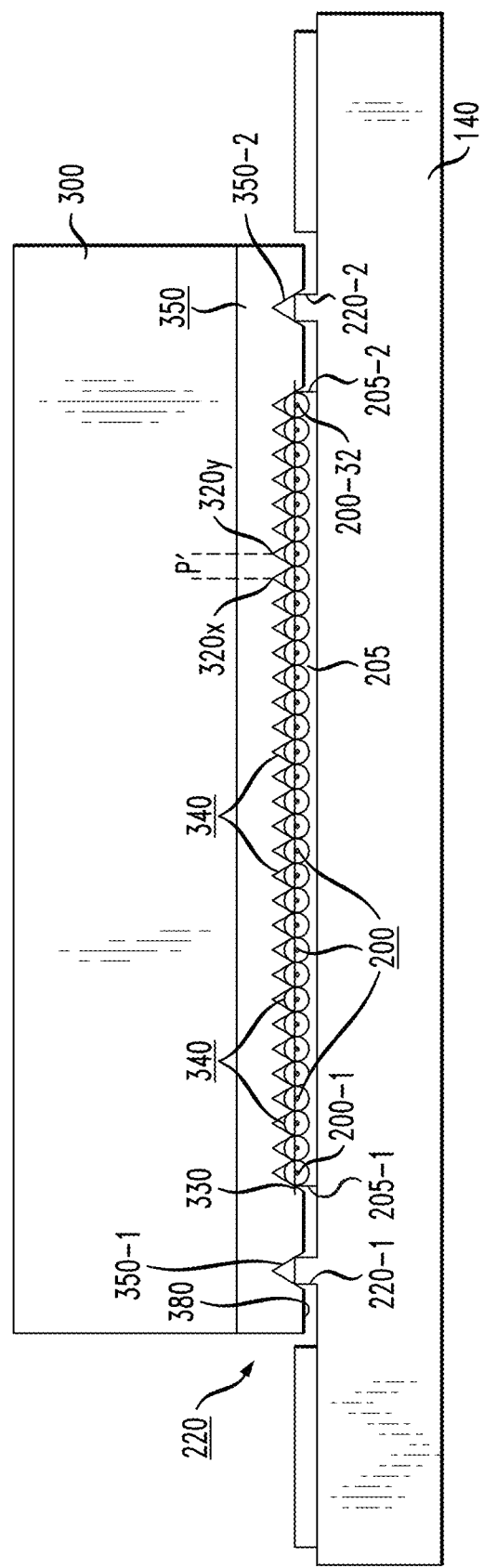
FIG. 11 illustrates another embodiment of the present invention, in this case useful with larger-sized arrays of waveguides and fibers, utilizing only extra-array alignment features to provide passive alignment between the fibers and the waveguides.
Figure 12:
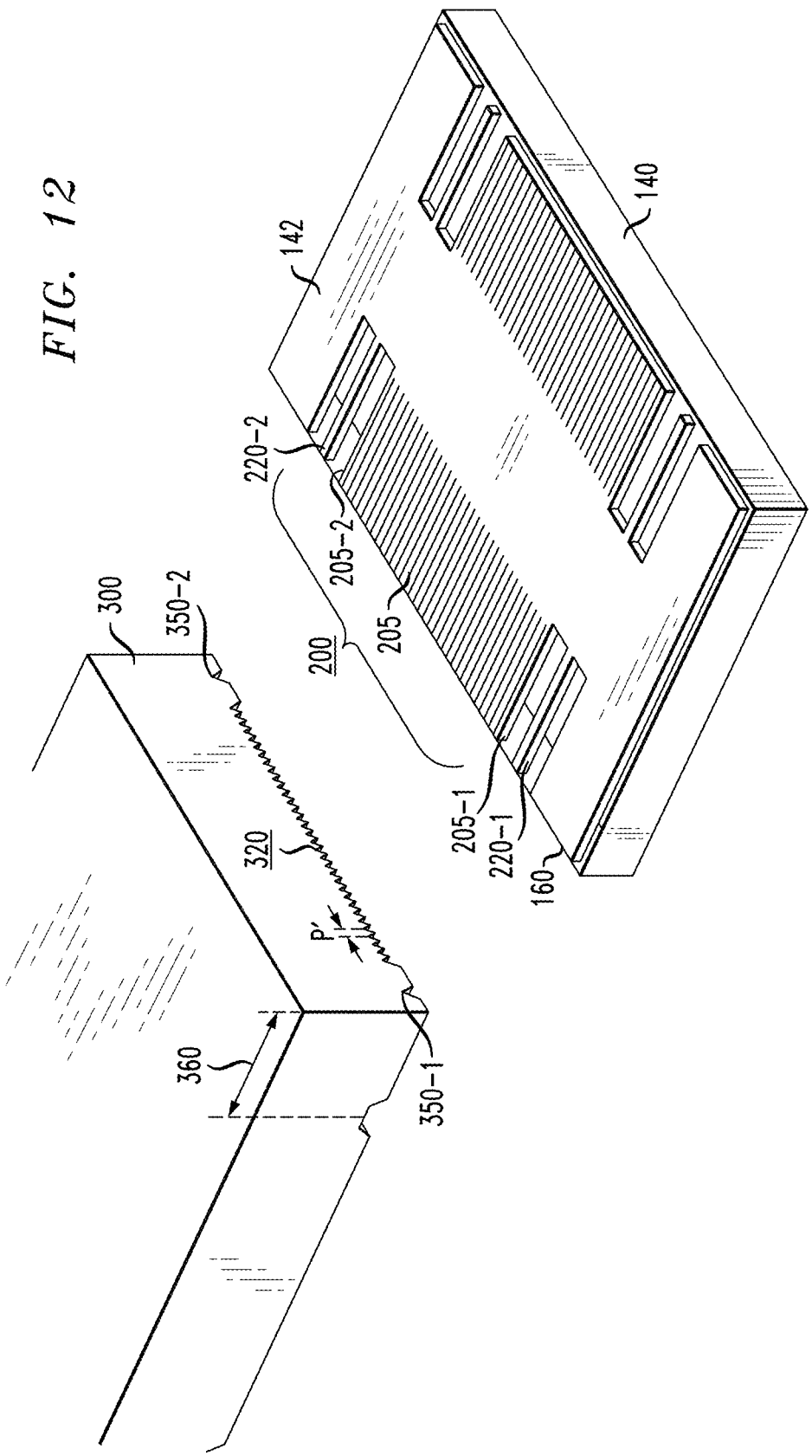
FIG. 12 is an exploded isometric view of the arrangement of FIG. 11.

FIG. 11 is a side view of a first configuration of this alternative embodiment of the present invention, and associated FIG. 12 is an exploded side view that clearly illustrates the elements used to provide passive alignment. In particular, FIGS. 11 and 12 illustrate a PIC 140 that is used to support a waveguide array 200 (in this specific example, an array of thirty-two individual waveguides; it is to be understood that this is just one example of the number of waveguides that may be used). As clearly shown in FIG. 12, waveguide array 200 may be formed as a monolithic, integrated component (as common in the art), referred to hereafter as integrated waveguide component 205.

A fiber array substrate 300 is also shown in FIGS. 11 and 12, and is used to support a fiber array 340 in passive alignment with waveguide array 200. In particular, fiber array substrate 300 is formed to include an array of fiber-supporting V-grooves 320, where an array of N optical fibers 340 utilize an array of N V-grooves 320. As mentioned above, it is preferred to form an interconnection between waveguide array 200 and fiber array 340 in a manner that is as compact as possible. In the example of FIG. 11, it is clear that there is relatively little space between adjacent waveguides 200, which results in fiber-supporting V-grooves 320 also being relatively close to one another.

In accordance with this embodiment of the present invention, passive alignment is provided between large arrays in a relatively compact arrangement by using only "extra-array" alignment features. That is, in contrast to the above-described embodiment, there are no alignment ridges positioned to surround the individual waveguides (as shown, for example, in FIG. 3). Instead and as shown in FIGS. 11 and 12, only extra-array alignment ridges 220 are used in combination with extra-array alignment V-grooves 350 to provide passive alignment between waveguide array 200 and fiber array 340, respectively. For the purposes of the present invention, "extra-array" alignment ridges are defined as ridges formed beyond opposing end terminations of the waveguide array structure; that is, one or more alignment ridges disposed in a spaced-apart relationship with a first waveguide in the array, and/or one or more alignment ridges disposed in a spaced-apart relationship with a last waveguide in the array. Similarly, extra-array alignment V-grooves 350 are formed beyond opposing end terminations of fiber-supporting V-grooves 320, as shown in the drawings.

In the particular configuration of FIGS. 11 and 12, only a single pair of extra-array alignment ridges 220 and a single pair of extra-array alignment V-grooves 350 are utilized. Particularly, a first alignment ridge 220-1 is formed beyond a first side edge 205-1 of integrated waveguide component 205 (that is, spaced-apart from a first waveguide 200-1), and a second alignment ridge 220-2 shown as formed beyond an opposing side edge 205-2 of integrated waveguide component 205 (that is, spaced-apart from a last waveguide 200-32). The single pair of extra-array alignment V-grooves are similarly positioned with respect to the "edge" fiber-supporting V-grooves (i.e., V-groove 320-1 and 320-32).

Figure 13:
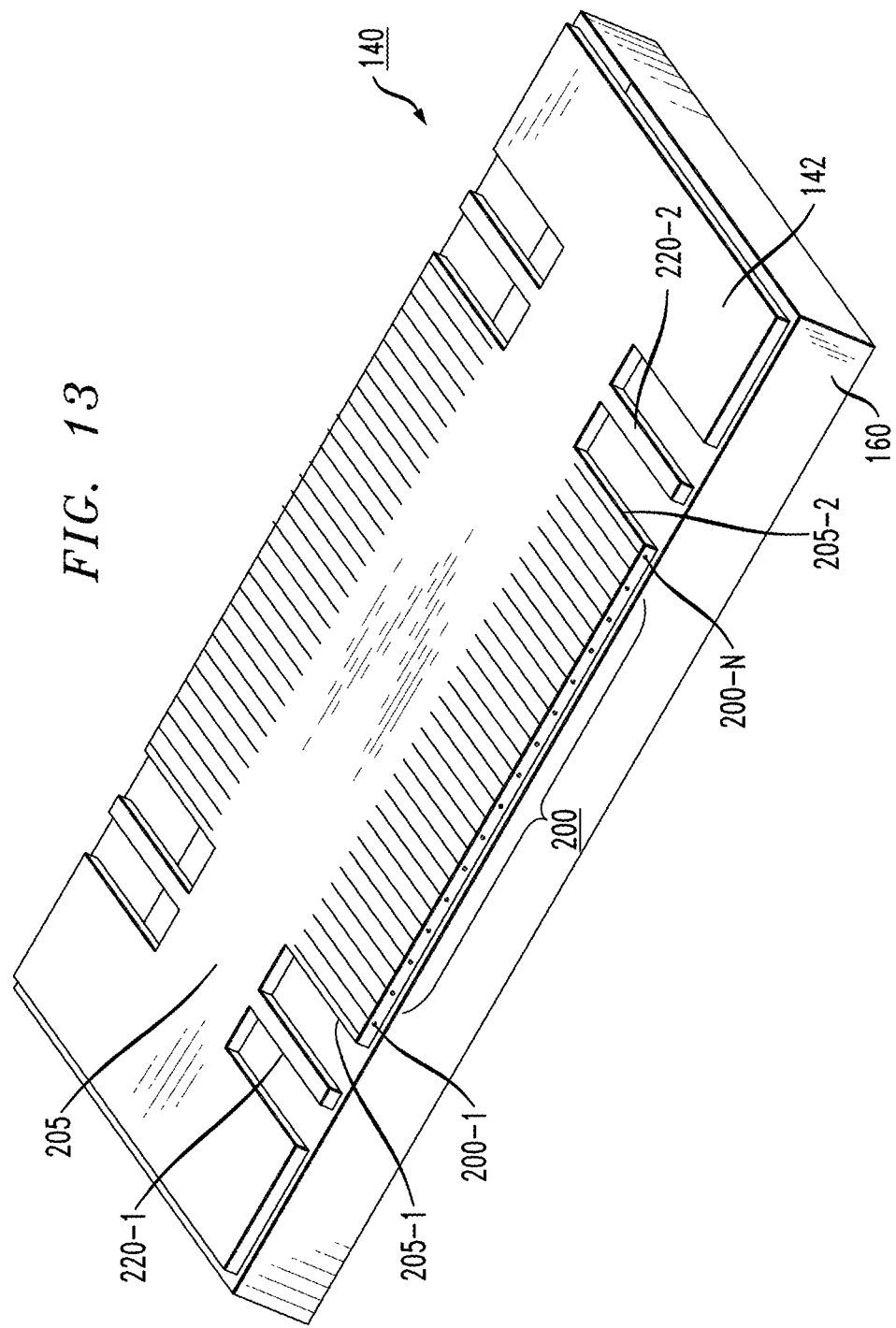
FIG. 13 is an isometric view of an exemplary PIC substrate, showing the formation of an integrated waveguide component (used to support an array of N waveguides), with a pair of extra-array alignment ridges disposed on either side of the integrated waveguide component.

FIG. 13 is an isometric view of an exemplary form of PIC 140 that clearly shows integrated waveguide component 205 disposed along a top surface 142 of PIC 140, where integrated waveguide component 205 is used to support the plurality of N optical waveguides 200. The endfaces of waveguides 200 are shown in this particular example as terminating at a position that is somewhat retracted from edge 160 of PIC 140. While not specifically shown, other examples of this embodiment may utilize an arrangement where waveguides 200 terminate at side edge 160. First side edge 205-1 of integrated waveguide component is shown in FIG. 13 as adjacent to first waveguide 200-1. Second side edge 205-2 is clearly illustrated in FIG. 13 as disposed beyond $N^{th}$ waveguide 200-N (e.g., waveguide 200-32). Extra-array alignment ridges 220-1, 220-2 are also shown in the view of FIG. 13.

It is to be noted that the use of a single pair of alignment ridges 220 with a single pair of alignment V-grooves 350 is just one example configuration. Other configurations may utilize two or more extra-array mating alignment ridges/V-grooves on either side of the structure, or any other suitable arrangement. For clarity, the arrays of optical fibers and optical waveguides may be defined as having N individual fiber/waveguide elements, with M individual alignment ridge/V-groove features.

In this particular configuration of a large number of individual signal paths (e.g., N=32), it is clear in the view of FIG. 11 that there is very little, if any, spacing between adjacent fibers within array 340; that is, the pitch P' between adjacent V-grooves 320x and 320y (for example) is only slightly greater than the diameter of an individual fiber 340i itself. In one example, optical fibers with an outer diameter of 125 μm may be used in an arrangement with a V-groove pitch P' of 127 μm.

Again, this compact type of arrangement is considered to be well-suited for the use of extra-array alignment features, in accordance with this embodiment of the present invention. Advantageously, the elimination of the intra-array alignment ridges eliminates the need to perform patterning and etching of PIC 140 to include these features, allowing for the monolithic form of waveguide array 200 to be used (e.g., integrated waveguide component 205, as shown in FIG. 13). Inasmuch as it is contemplated that future architectures may use even larger waveguide arrays (N>32), the ability to maintain a relatively compact configuration by eliminating the need for inter-array ridges becomes even more important.

Figure 14:
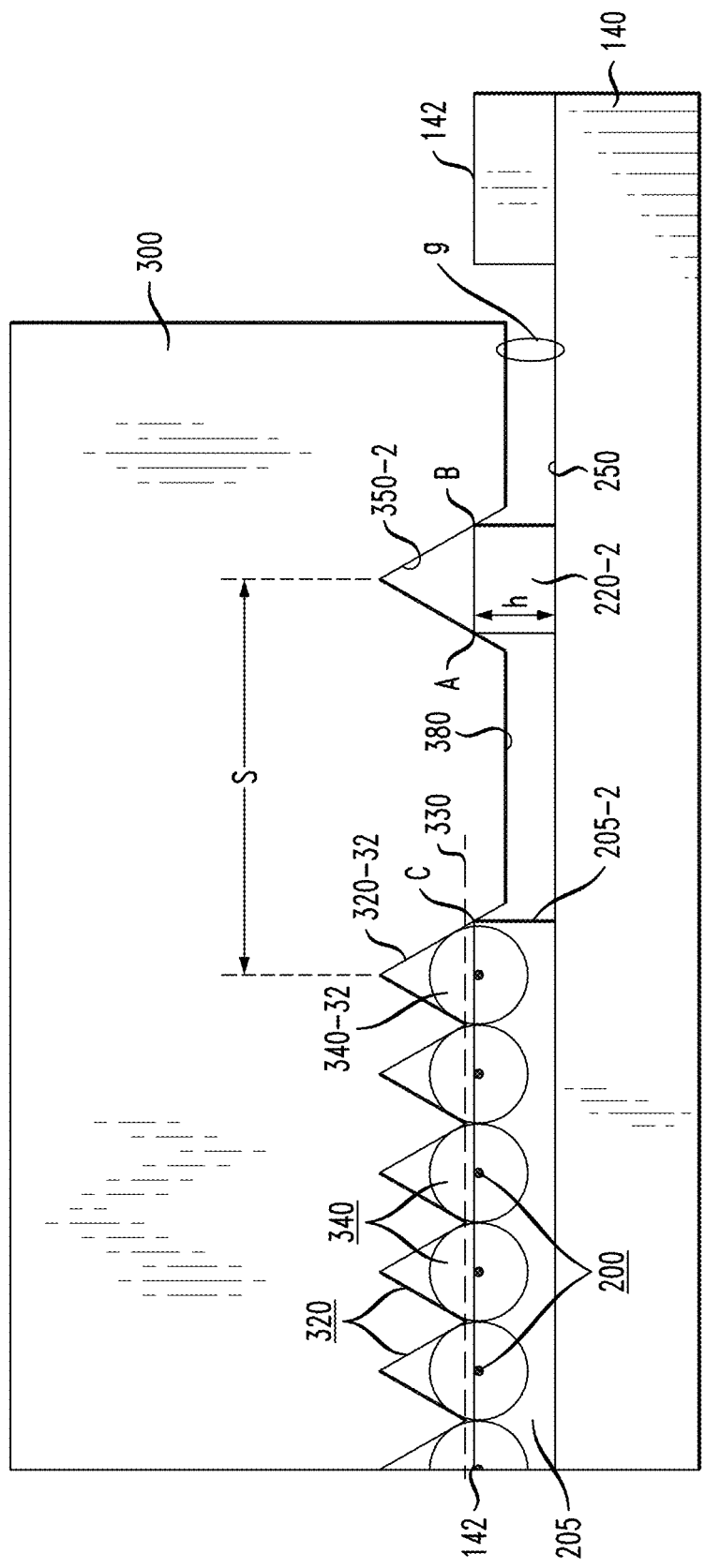
FIG. 14 is an enlarged view of a portion of the arrangement of FIG. 11, showing in detail the engagement between an extra-array alignment ridge and an extra-array alignment V-groove.

FIG. 14 is an enlargement of one end of the arrangement as shown in FIG. 11, in particular showing the relationship between alignment ridge 220-2 of PIC 140 and alignment V-groove 350-2 of fiber array substrate 300. Alignment ridge 220-2 is shown as disposed beyond second side edge 205-2 of integrated waveguide component 205 (within which waveguide array 200 is fabricated). Alignment ridge 220-2 is formed to have a height h sufficient to maintain the necessary gap spacing g between PIC 140 and fiber array substrate 300 (that is, gap spacing g is used to prevent physical contact between the two elements).

Again, as described in detail above, this gap spacing g is maintained by forming extra-array alignment ridges 220 to have a height h that contacts the interior of alignment V-grooves 350 at locations A and B (as shown in FIG. 14). By controlling the height h of alignment ridges 220, physical contact between the two components will be prevented and the passive optical alignment will be maintained. In a preferred embodiment, the width of integrated waveguide component 205 may be controlled such that side edges 205-1 and 205-2 are also in physical contact with mating fiber-supporting V-grooves 320 within fiber array substrate 300. This contact is particularly shown in the enlargement of FIG. 14, which illustrates second side edge 205-2 as contacting an inner wall of final fiber-supporting V-groove 340-32 at a location C.

With continued reference to FIGS. 11-14, it is also shown that the point terminations of fiber-supporting V-grooves 320 reside along a line 330 below top surface 380 of fiber array substrate 300. As a result, fiber-supporting V-grooves 320 are not considered as interfering with the joining (and passive alignment) between fiber array substrate 300 and PIC 140. That is, even with fiber-supporting V-grooves 320 extending to the end of fiber array substrate 300, a spacing/clearance remains between V-groove termination line 330 and top surface 142 of PIC 140.

Figure 15:
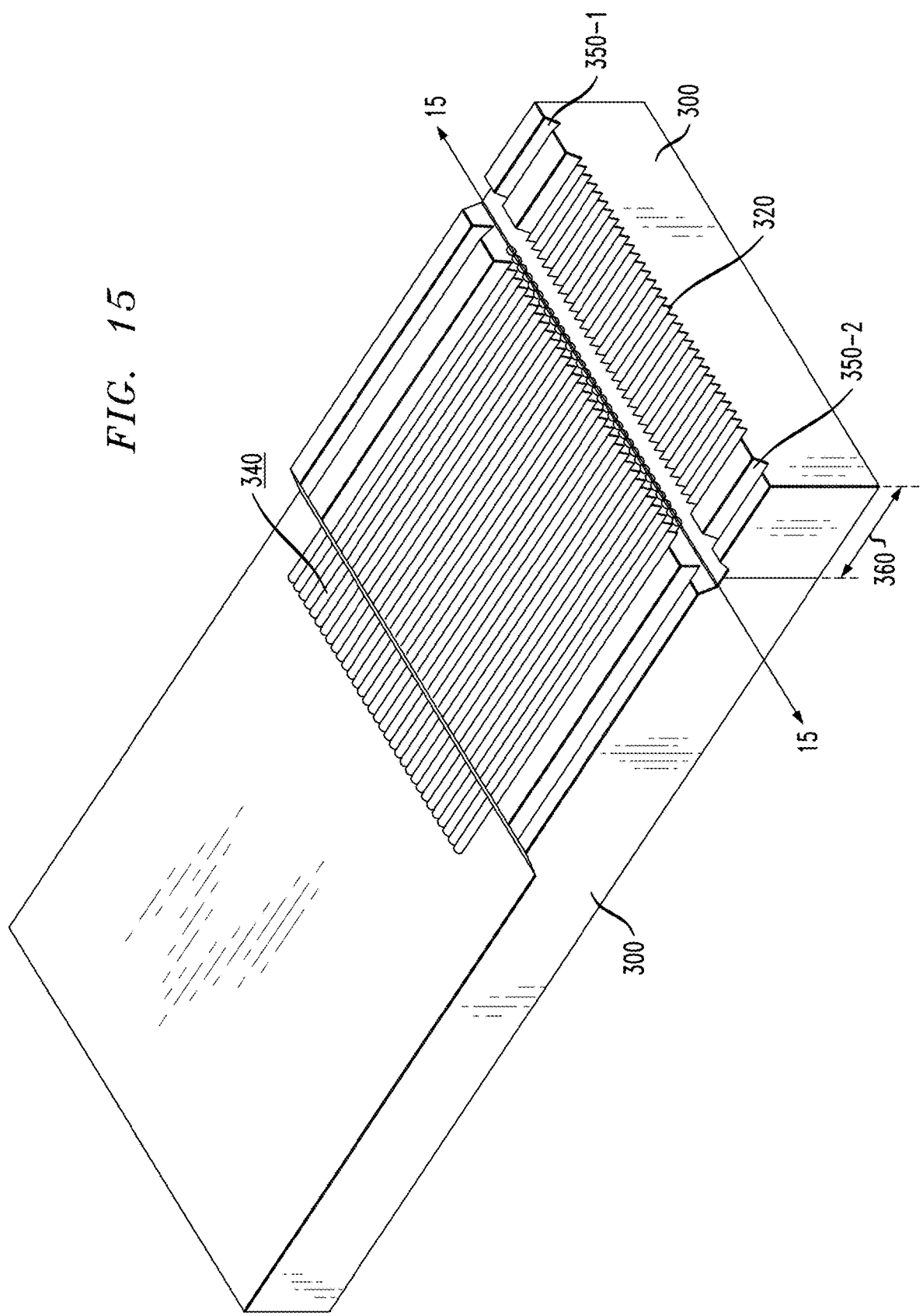
FIG. 15 is a view of the underside of the fiber array substrate component of the arrangement of FIG. 11, illustrating the positioning of the fiber-supporting V-grooves and extra-array alignment V-grooves, as well as a proximal end portion that overlaps with the PIC upon mating.

FIG. 15 is an isometric view of the underside of fiber array substrate 300. Particularly evident in this view is an included proximal end portion 360 that functions in a manner similar as end portion 36 of the previously-described embodiment. That is, while fiber-supporting V-grooves 320 are shown as extending across proximal end portion 360, fibers 340 are retracted somewhat (fiber endfaces terminating along line 15-15 of FIG. 15). Obviously, extra-array alignment V-grooves 350-1, 350-2 also extend along proximal end portion 360, since it is this particular region that overlaps with PIC 140 and provides passive optical alignment between extra-array alignment ridges 220 and extra-array alignment V-grooves 350.

Figure 16:
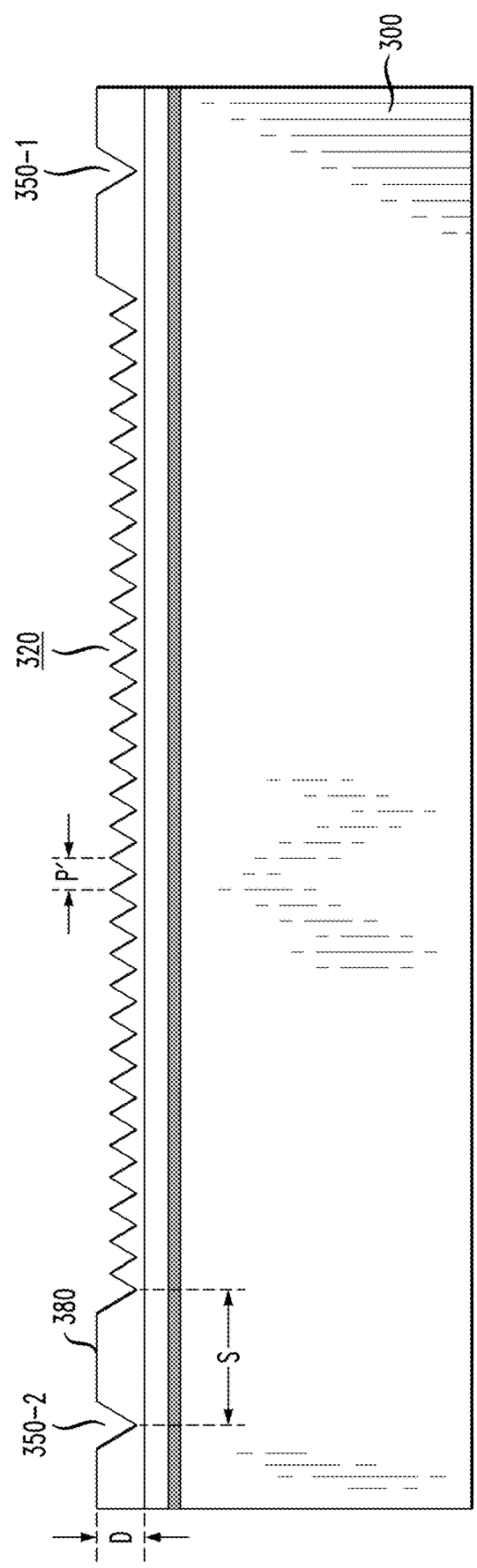
FIG. 16 is an end view of the fiber array substrate, illustrating the positioning of both the fiber-supporting and extra-array alignment V-grooves, in this case where all V-grooves are formed to terminate at a common depth D below the surface of the substrate.

FIG. 16 is an end view of fiber array substrate 300 as taken along line 15-15 of FIG. 15. In a preferred configuration of this embodiment of the present invention, both fiber-supporting V-grooves 320 and extra-array alignment V-grooves 350 exhibit the same depth D (although it is to be understood that fiber supporting V-grooves 320 may be formed to have a first depth and alignment V-grooves 350 a second depth). Maintaining the same depth allows for consistent variation for all of the V-grooves formed in a given component. Indeed, in a preferred fabrication process, a single patterning and etching process may be used to form V-grooves 320 and 350 within a fiber array substrate 300 that is formed of silicon (for example). That is, surface 380 is patterned in a manner that will provide the necessary pitch P′ between adjacent fiber-supporting V-grooves 320, as well as the appropriate spacing S (which may be as small as zero) between the end terminations of the array V-grooves 320 and alignment V-grooves 350. The term "appropriate", in this context, means that alignment V-grooves 350 will be properly located so as to engage with alignment ridges 220 upon mating of PIC 140 with fiber array substrate 300. In this example of a very small pitch P′, V-grooves 320 overlap one another during the etching process, resulting in the arrangement as shown. As mentioned above, while using V-grooves of a like depth may be a preferred embodiment, it is to be understood that there may be applications where the geometry of fiber-supporting V-grooves 320 differs from that of alignment V-grooves 350, with their depths being different accordingly.

Figure 17:
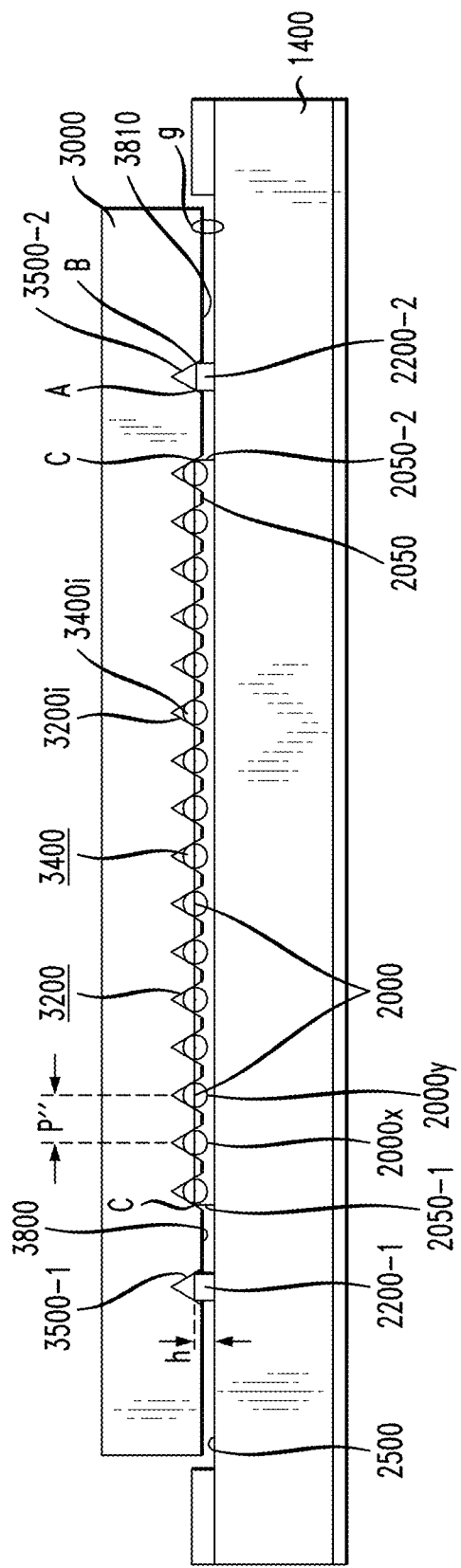
FIG. 17 illustrates another configuration of this additional embodiment, in this case the arrays exhibiting a pitch somewhat greater than that shown in FIG. 11.
Figure 18:
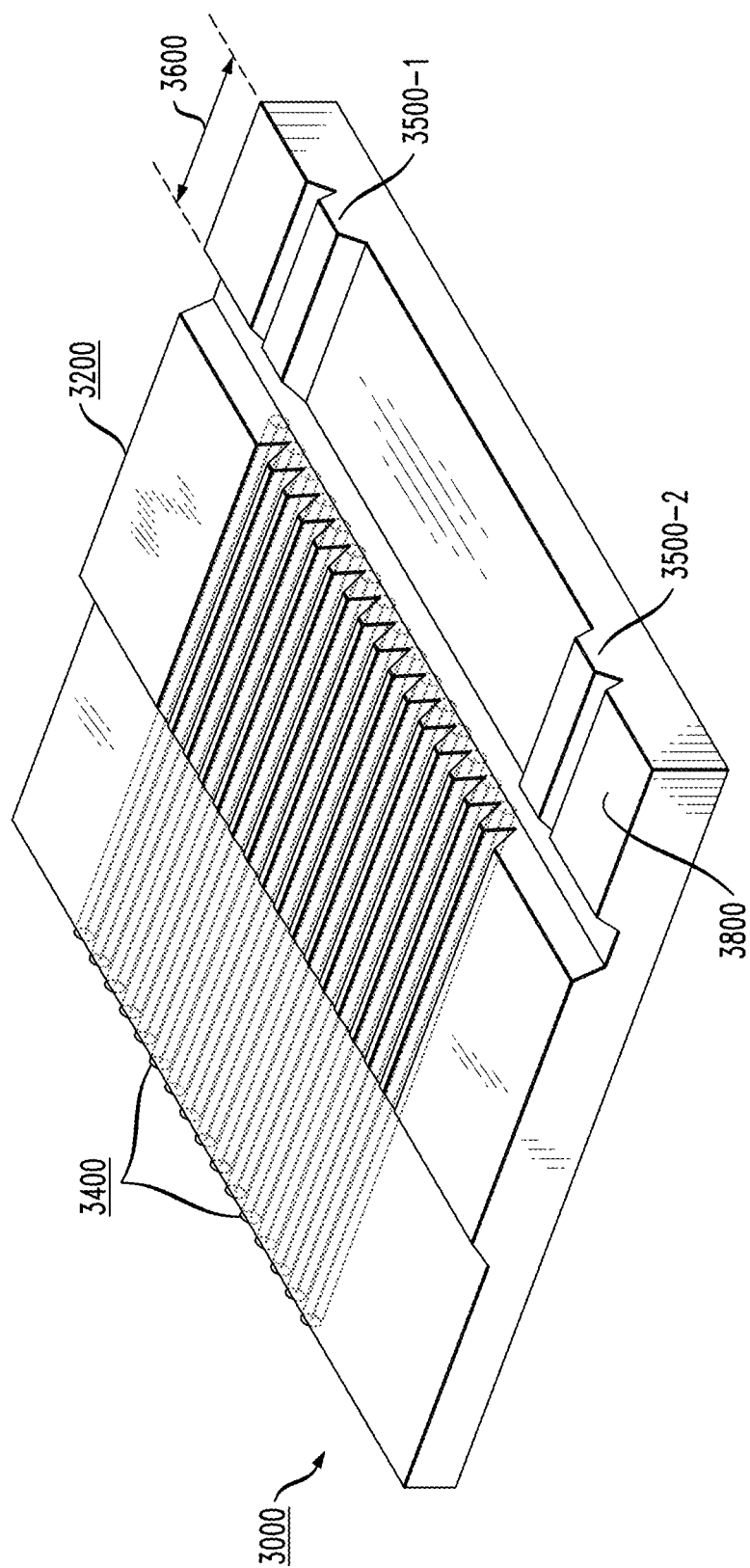
FIG. 18 is an isometric view of the underside of the fiber array substrate of FIG. 17.

Another configuration of this exemplary embodiment using only extra-array alignment ridges (i.e., not including intra-array alignment ridges as in the embodiments of FIGS. 1-10) is shown in FIGS. 17-19. FIG. 17 illustrates a passively aligned arrangement between an integrated waveguide array 2000 (formed in a PIC 1400) and a fiber array 3400 (supported by V-grooves 3200 formed within a fiber array substrate 3000). Each individual fiber 3400i is shown as supported by a separate V-groove 3200i.

In this configuration, there is a larger pitch P″ between adjacent waveguides 2000x, 2000y than in the arrangement of FIGS. 11-16. Thus, the same larger pitch P″ is formed between adjacent fiber V-grooves 3200i. In some cases, a pitch on the order of about 250 μm may be used with fibers of 125 μm diameter. Said another way, the configuration of fiber array substrate 3000 comprises a wider spacing between adjacent fibers than the micron-level spacing of fiber array substrate 300 in FIG. 11. This extended spacing is associated with a like spacing between adjacent waveguides 2000 as formed in a mating PIC 1400.

As described above in association with FIGS. 11-16, PIC 1400 of FIG. 17 is formed to include a pair of extra-array alignment ridges 2200-1, 2200-2, with each alignment ridge formed beyond an end termination of optical waveguide array 2000. Again, this particular configuration is based upon waveguide array 2000 as integrated within an integrated waveguide component 2050, with a first alignment ridge 2200-1 disposed beyond a first edge 2050-1 of integrated waveguide component 2050 and second alignment ridge 2200-2 disposed beyond a second, opposing edge 2050-2 of integrated waveguide component 2050.

Fiber array substrate 3000 is shown in FIG. 17 as including a pair of alignment V-grooves 3500-1, 3500-2 formed in an extra-array configuration with the array of fiber-supporting V-grooves 3200, and particularly positioned to mate with alignment ridges 2200-1, 2200-2, respectively, and thus provide passive alignment as the two components are joined together. The height h of ridges 2200 is controlled in a similar manner to maintain a gap spacing g between a top surface 3800 of fiber array substrate 3000 and landing surface 2500 of PIC 1400. Again in this embodiment, each alignment ridge 2200 physically contacts the inside of its associated alignment V-groove 3500 at points A and B. Also shown in this view is the preferred configuration where side edges 2050-1, 2050-2 of integrated waveguide component 2050 contact internal edges of first/last fiber-supporting V-grooves 3200-1, 3200-32 (shown as points C in FIG. 17).

FIG. 18 is an isometric view of an underside of fiber array substrate 3000. Evident in this view is the elimination of the portions of fiber V-grooves 3200 that would otherwise extend into a proximal end portion 3600 of fiber array substrate 3000 (it is to be noted that a similar arrangement is possible with fiber array substrate 300, with V-grooves 320 terminating before proximal end portion 360). Alignment V-grooves 3500-1, 3500-2 are illustrated as extending completely across proximal end portion 3600, since it is this region of fiber array substrate 3000 that overlaps and mates with PIC 1400 (as shown in FIG. 17) in a manner that provides passive alignment between waveguides 2000 and optical fibers 3400, as particularly illustrated in FIG. 17.

FIG. 19 is a side view of fiber array substrate 3000, similar to the view of FIG. 16 associated with the first configuration of this second embodiment. Again, all V-grooves 3200 and 3500 are formed to exhibit the same depth D′ into fiber array substrate 3000. In the particular geometry of this embodiment, with the larger pitch P‴ between adjacent fiber-support V-grooves 3200, there is no overlap of fiber-supporting V-grooves 3200 during etching (as evidenced by the flat surface portions between adjacent V-grooves 3200).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the specific configurations as described. Accordingly, many modifications and variations will be apparent to those skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein and defined by the claims appended hereto.

What is claimed is:

1. An interconnection arrangement providing passive alignment between an array of N optical fibers and an array of N optical waveguides, the interconnection arrangement comprising:
 a photonic integrated circuit (PIC) including
  an optical substrate having a top planar major surface and adjoining planar side edge surfaces;
  the array of N optical waveguides formed as an integrated element and disposed on the top planar major surface of the optical substrate, terminating at a selected adjoining planar side edge surface thereof, and
  a plurality of M extra-array alignment ridges disposed on the top planar major surface of the optical substrate and terminating at the selected adjoining planar side edge surface thereof, the plurality of M extra-array alignment ridges positioned beyond the extent of the array of N optical waveguides, where each extra-array alignment ridge exhibits a defined height h; and
 a fiber array substrate including
  an array of N fiber-supporting V-grooves formed in a top surface thereof, and
  a plurality of M extra-array alignment V-grooves disposed to engage with the plurality of M extra-array alignment ridges in a one-to-one relationship and provide passive alignment between the array of N optical waveguides and the array of N optical fibers, the fiber array substrate positioned over the top planar major surface of the PIC to overlap the plurality of M extra-array alignment ridges such that each extra-array alignment V-groove engages with its associated extra-array alignment ridge, with a pair of upper corners of each extra-array alignment ridge contacting inner sidewalls of the associated extra-array alignment V-groove at a location that creates alignment between a core region of an optical fiber supported within the associated V-groove and the optical waveguide integrated within the PIC so as to provide passive alignment between the array of N optical fibers and the array of N optical waveguides, with the alignment ridge height h selected to ensure that a gap spacing g remains between the top surface of the fiber array substrate and the top planar major surface of the PIC upon engagement of the plurality of M alignment V-grooves with the plurality of M extra-array alignment ridges.

2. The interconnection arrangement as defined in claim 1 wherein the plurality of N fiber-supporting V-grooves and the plurality of M extra-array alignment V-grooves terminate at a same depth D below the top surface of the fiber array substrate.

3. The interconnection arrangement as defined in claim 2 wherein the plurality of N fiber-supporting V-grooves and the plurality of M extra-array alignment V-grooves comprise etched V-grooves positioned to exhibit a defined pitch for the plurality of N fiber-supporting V-grooves and a defined position of each extra-array alignment V-groove of the plurality of M extra-array alignment V-grooves.

4. The interconnection arrangement as defined in claim 3 wherein the fiber array substrate comprises a silicon material.

5. The interconnection arrangement as defined in claim 1 wherein the plurality of M extra-array alignment ridges comprises a first alignment ridge disposed beyond a first waveguide of the plurality of N optical waveguides and a second alignment ridge disposed beyond a last waveguide of the plurality of N optical waveguides.

6. The interconnection arrangement as defined in claim 1 wherein the plurality of N optical waveguides are formed as a monolithic, integrated optical component across the top planar major surface of the PIC, the monolithic, integrated optical component defined as having opposing first and second side edges beyond the extent of the array of N optical waveguides as formed therein.

7. The interconnection arrangement as defined in claim 6 wherein the monolithic, integrated optical component exhibits a width w such that an interior edge of a first fiber supporting V-groove of the plurality of N fiber-supporting V-grooves is positioned in physical contact with the first side edge of the monolithic, integrated optical component.

8. The interconnection arrangement as defined in claim 7 wherein an interior edge of a final, $N^{th}$ supporting V-groove of the plurality of N fiber-supporting V-grooves is positioned in physical contact with the second side edge of the monolithic, integrated optical component.

9. The interconnection arrangement as defined in claim 1 wherein $M \geq 2$.

10. The interconnection arrangement as defined in claim 1 wherein the plurality of N fiber-supporting V-grooves terminate at a first depth below a top surface of the fiber array substrate and the plurality of M extra-array alignment V-grooves terminate at a second depth below a top surface of the fiber array substrate.

11. The interconnection arrangement as defined in claim 1 wherein
 the array of N fiber-supporting V-grooves extends across a portion of the fiber array substrate, terminating before a proximal end portion of the fiber array substrate; and
 the plurality of M extra-array alignment V-grooves extend fully across the fiber array substrate including the proximal end portion thereof.

* * * * *